(12) United States Patent
Kuttappa (10) Patent No.: US 8,202,462 B2
(45) Date of Patent: Jun. 19, 2012

(54) GOLF-BALL-COVER CASTING MOLDS WITH SELF-CENTERING MOLD-CAVITY INSERTS

(75) Inventor: Sanjay Mukatira Kuttappa, Oceanside, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

(21) Appl. No.: 13/209,244

(22) Filed: Aug. 12, 2011

(65) Prior Publication Data

US 2011/0298153 A1    Dec. 8, 2011

Related U.S. Application Data

(62) Division of application No. 12/005,553, filed on Dec. 26, 2007, now Pat. No. 8,021,590.

(51) Int. Cl.
*B29C 70/70*    (2006.01)
*B29C 33/30*    (2006.01)
*B29C 39/10*    (2006.01)

(52) U.S. Cl. ............... 264/279.1; 425/116; 425/195; 264/277

(58) Field of Classification Search ............ 425/116, 425/195, 192 R, 121, 408, 344; 264/277, 264/279.1, 275
See application file for complete search history.

(56) References Cited

U.S. PATENT DOCUMENTS

| | | | |
|---|---|---|---|
| 2,361,348 A | 10/1944 | Dickson et al. | |
| 3,344,468 A | 10/1967 | Moslo | |
| 4,959,002 A | 9/1990 | Pleasant | |
| 5,112,556 A | 5/1992 | Miller | |
| 5,201,523 A | 4/1993 | Miller | |
| 5,882,567 A | 3/1999 | Cavallaro et al. | |
| 6,003,724 A | 12/1999 | Collins et al. | |
| 6,171,091 B1 | 1/2001 | Bettencourt | |
| 6,346,053 B1 | 2/2002 | Inoue et al. | |
| 6,439,873 B1 | 8/2002 | Marshall | |
| 6,632,078 B2 | 10/2003 | Ogg et al. | |
| 6,644,948 B2 | 11/2003 | Mydlack et al. | |
| 6,659,886 B1 | 12/2003 | Yamagishi et al. | |
| 6,685,456 B2 | 2/2004 | Sajima | |
| 6,769,900 B2 | 8/2004 | Murphy et al. | |
| 6,902,491 B2 | 6/2005 | Barlow et al. | |
| 6,936,208 B2 | 8/2005 | Ogg | |
| 7,041,007 B2 | 5/2006 | Boehm et al. | |
| 7,070,726 B2 | 7/2006 | Tzivanis et al. | |

(Continued)

*Primary Examiner* — Joseph Del Sole
*Assistant Examiner* — Nahida Sultana
(74) *Attorney, Agent, or Firm* — Klarquist Sparkman, LLP (57) ABSTRACT

Molds are disclosed for forming golf-ball covers by casting. An exemplary mold includes first and second support members that are placeable in face-to-face opposition to each other. At least one respective mold-cavity insert, defining a respective hemispherical cavity, is mounted to each support member. The mold-cavity insert is floatable in at least three (e.g., x, y, z) degrees of freedom relative to the respective support member. Each mold-cavity insert on the first support member is in face-to-face opposition to a respective mold-cavity insert on the second support member whenever the support members are in face-to-face opposition to each other, such that the respective hemispherical cavities of each opposing pair of inserts form respective spherical ball-cover cavities. A respective z-direction bias is associated with each mold-cavity insert. Also, a respective self-centering device is associated with each opposing pair of inserts. The self-centering device urges movement of at least one mold-cavity insert of the opposing pair in any of at least three degrees of freedom as required to center the mold-cavity inserts of the opposing pair with each other.

6 Claims, 6 Drawing Sheets

U.S. PATENT DOCUMENTS

| | | |
|---|---|---|
| 7,244,384 B1 | 7/2007 | Dewanjee et al. |
| 7,793,705 B2 | 9/2010 | Kuo |
| 7,842,220 B2 | 11/2010 | Hinomoto et al. |
| 7,866,972 B2 | 1/2011 | Kuo |
| 2001/0045688 A1 | 11/2001 | Royer |
| 2006/0045931 A1 | 3/2006 | Ito et al. |
| 2006/0286196 A1 | 12/2006 | Chien |
| 2008/0020081 A1 | 1/2008 | Wilson et al. |
| 2008/0203615 A1 | 8/2008 | Brum |
| 2008/0317892 A1 | 12/2008 | Aoyama et al. |
| 2009/0039552 A1 | 2/2009 | Wilson et al. |
| 2009/0075757 A1* | 3/2009 | Kennedy et al. ............ 473/374 |
| 2010/0029414 A1* | 2/2010 | Sullivan ..................... 473/385 |
| 2010/0081518 A1* | 4/2010 | Sullivan et al. ............. 473/376 |
| 2010/0129484 A1 | 5/2010 | Ansell et al. |
| 2010/0234138 A1* | 9/2010 | Watanabe et al. .......... 473/373 |
| 2010/0255937 A1* | 10/2010 | Sullivan et al. ............. 473/376 |
| 2010/0303944 A1 | 12/2010 | Yeh et al. |
| 2010/0316756 A1 | 12/2010 | Nakagawa et al. |
| 2011/0070974 A1 | 3/2011 | Omura et al. |

* cited by examiner

GOLF-BALL-COVER CASTING MOLDS WITH SELF-CENTERING MOLD-CAVITY INSERTS

CROSS-REFERENCE TO RELATED APPLICATION

This application is a divisional of U.S. patent application Ser. No. 12/005,553, filed on Dec. 26, 2007 now U.S. Pat. No. 8,021,590, the contents of which are being incorporated herein by reference in its entirety.

FIELD

This disclosure pertains to, inter alia, molds used for manufacturing golf balls. More specifically, the disclosure pertains to molds used for casting the outer layer ("cover") of golf balls.

BACKGROUND

Figure 7:
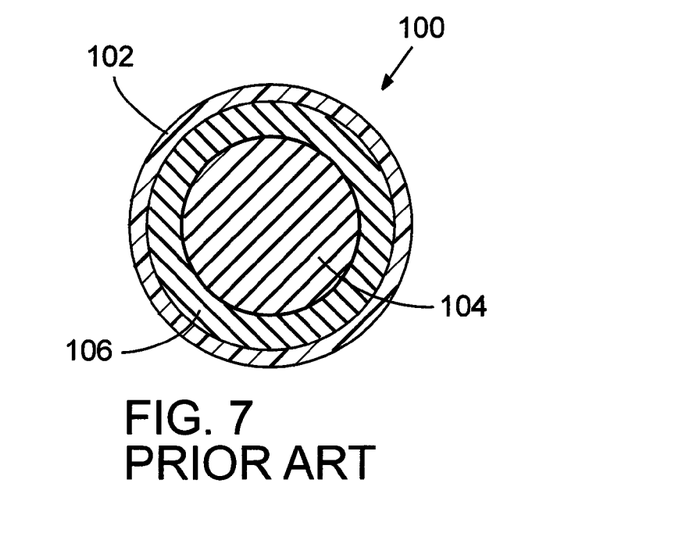
FIG. 7 is a section of a conventional golf ball, showing a core, mantle, and cover. The core and mantle collectively constitute a "core" as this term is generally used herein. The surface of the core is sealingly covered by the cover.

Golf balls have undergone substantial evolution since the early days of the game. A modern golf ball 100 (see FIG. 7) is made with multiple layers, including an outer layer 102 called a "cover" and an inner body 104 called a "core." Many modern golf balls have at least one additional layer, called a "mantle" 106, situated concentrically outside the core 104. The cover 102 is typically formed around the mantle 106 so that the cover is concentric with the mantle and the mantle and core are sealed inside the cover. For purposes of description herein, the term "core" is used generally herein to denote the portion of a golf ball located inside the cover and providing the surface on which the cover is formed, regardless of whether the core comprises one or more layers.

Conventional techniques used for forming the cover include casting, compression molding, and injection molding. The surficial dimples are formed at the same time as the cover. Injection molding is usually used for forming covers of thermoplastic materials. Compression molding is used for forming covers of polyisoprene (e.g., "balata" or gutta percha) and of certain polyurethane materials. Casting is usually used for forming covers of a thermoset material such as polyurethane, which is formed by reaction of diisocyanate, polyol, and polyamine.

Injection molding is usually performed using a mold body comprising two mold halves. Each mold half defines at least one hemispherical cavity that, when brought together with the corresponding hemispherical cavity in the other mold half, form a respective spherical ball cavity. The hemispherical cavities include retractable pins that center the core in the cavity to ensure that the cover to be formed will be concentric with the core and have substantially uniform thickness. After placing the core in the mold, the mold is closed and a liquid thermoplastic material is injected under high pressure and temperature around the core in the cavity. The pins retract into the mold halves before the thermoplastic material fully envelops the core. As the pins retract, the thermoplastic material fills the spaces previously occupied by the pins. The thermoplastic material is then allowed to cure fully and the ball is removed from the mold. Examples of injection molding of ball covers are discussed in U.S. Pat. Nos. 5,112,556 and 5,201,523.

Compression molding is performed by placing two compliant cover "blanks" around a core. Each blank is configured to become, by high-pressure molding, a respective half of the cover. The core with blanks in place is placed in a ball cavity formed by bringing together two mold halves that define respective hemispherical cavities. During molding, the mold heats (and thus softens), compresses, and urges the blanks tightly around the core at high pressure. The high pressure also seals the two blanks together around the equator of the ball. The ball is allowed to cool and then removed from the mold. See, e.g., U.S. Pat. No. 3,989,568 to Isaac and U.S. Pat. No. 3,130,102 to Watson et al.

Casting (also called "cast-molding") is performed in a ball cavity formed by bringing together two mold halves that define respective hemispherical cavities. Casting is especially suitable for forming the cover of a thermoset material. A precise amount of liquid thermoset resin is introduced into the hemispherical cavities and partially cured ("gelled"). The core is placed in the hemispherical cavity of one mold half and supported by the partially cured resin. The second mold half is placed relative to the first mold half to enclose the core and resin in the resulting ball cavity. As the mold halves are brought together, the resin flows around the core and forms the cover. The mold body is heated briefly to cure the resin, then cooled for removal of the ball from the mold body. Advantages of casting are that it achieves substantial uniformity of cover thickness without having to use centering pins, and it can be performed at a much lower pressure inside the mold than injection molding or compression molding. Indeed, casting can be performed at substantially zero gauge pressure.

Since all three cover-molding techniques utilize, per ball, two hemispherical cavities that are brought together to form a spherical ball cavity, there is concern with events occurring at the "parting line" during molding. The parting line is represented as an equatorial line on the ball at which the two hemispherical cavities came together, more specifically where the "parting surfaces" of the opposing mold halves came together. Certain problems with the hemispherical cavities or with the parting surfaces, such as "offset" (axial mis-registration or axis-angular mismatch, roundness mismatch, or diametrical mismatch) of the hemispherical cavities with respect to each other or variations in the width of the parting line around the equator, is usually manifested as a corresponding anomaly on the ball cover formed in the mold. Example anomalies include excess equatorial "step," excess width of flashing, excess thickness of flashing, and unequal width or thickness of flashing around the ball. Because of their adverse impact on ball trajectory during play and their objectionable appearance, these anomalies are usually removed by the manufacturer, which requires that the manufacturer include one or more post-molding manufacturing processes such as localized buffing or grinding. In general, the more pronounced the surficial anomaly, the more extensive (and costly) the post-molding buffing or grinding process. The required buffing or grinding can be of such magnitude that their effects on the ball surface are aesthetically objectionable and/or interfere with ball trajectory.

Ball-cover molds are usually used many times, and changes in the parting line can occur with repeated use of a mold. For example, axial mis-registration (side-to-side shift) or axis-angular mismatch of the mold halves with each other can occur and/or progress with repeated use of the mold. Unless strict quality control is exercised, such drifts can result in an out-of-control process that produces an unacceptable number of reject product. Unfortunately, correcting this problem usually means replacing the mold with a new one, and new cover molds are very expensive.

For manufacturing large numbers of golf balls quickly, manufacturers automate the cover-forming process as much as possible, and use cover molds configured to cover multiple golf balls simultaneously. To this end, the cover molds typically define multiple ball cavities (e.g., four or eight). To provide some correction of mis-registration of mold halves with each other, some conventional cover molds are spring-loaded. However, the resulting correction is usually not ideal for each of the multiple ball cavities defined by the mold, especially since dimensional shifts can occur in one ball cavity relative to another in the same mold.

SUMMARY

Various problems of conventional devices and methods, as summarized above, are addressed by various aspects of the invention as disclosed herein.

One aspect concerns mold-halves for golf-ball-cover casting molds. An embodiment of such a mold-half comprises a support member, a mold-cavity insert, a mounting, and a self-centering device. The mold-cavity insert defines a substantially hemispherical ball-cover cavity. The mounting couples the mold-cavity insert to the support member and provides floatability of the mold-cavity insert, relative to the support member, in multiple degrees of freedom (for example, and not intending to be limiting, in x, y, and z degrees of freedom). The self-centering device is associated with the mold-cavity insert and is engageable with a mating mold-cavity insert on a facing support member to urge movement of the mold-cavity insert in the degrees of freedom as required to center the mold-cavity insert with the mating mold-cavity insert.

Desirably, the mold-half includes a bias (desirably a z-direction bias, wherein x- and y-directions define major surfaces of the support member). The bias facilitates positioning of the mold-cavity relative to the support member without interfering significantly with the floatability of the mold-cavity insert relative to the support member. The bias desirably is a z-direction bias (relative to x- and y-dimensions of the support member). An example bias is a compression spring such as, but not limited to, a "wavy washer."

The support member can comprise or be configured as a plate defining a bore. With such a support member, the mold-cavity insert can be situated in the bore with sufficient clearance to provide the floatability of the mold-cavity insert in the multiple degrees of freedom.

The self-centering device can have any of various configurations such as, but not limited to, pin-and-hole or mutually engaging sloped surfaces.

Another aspect of the invention concerns molds for casting golf-ball covers. An embodiment of such a mold comprises first and second support members that are placeable in face-to-face opposition to each other. At least one respective mold-cavity insert, defining a respective substantially hemispherical cavity, is mounted to each support member. The at least one mold-cavity insert is floatable in multiple (e.g., x, y, and z) degrees of freedom relative to the respective support member. Each mold-cavity insert on the first support member is in face-to-face opposition to a respective mold-cavity insert on the second support member whenever the support members are in face-to-face opposition to each other such that the respective substantially hemispherical cavities of each opposing pair of inserts form respective spherical ball-cover cavities. A respective z-direction bias is associated with each floatable mold-cavity insert. Associated with each opposing pair of inserts is a self-centering device that urges movement of at least one mold-cavity insert of the opposing pair in any of the multiple degrees of freedom as required to center the mold-cavity inserts of the opposing pair with each other.

According to another aspect, methods are provided for casting a cover on a golf ball. An embodiment of such a method comprises mounting at least one opposable pair of first and second mold-cavity inserts, each insert defining a respective substantially hemispherical cavity for casting a respective half of a cover and each insert defining a respective parting surface, to respective support members in a manner providing at least one of the first and second mold-cavity inserts with floatability in at three degrees of freedom relative to the respective support member. The mold-cavity inserts of the opposable pair are provided with respective self-centering devices. A castable resin and core are added to the hemispherical cavities of the mold-cavity inserts of each opposable pair. The support members are moved to position the mold-cavity inserts of the opposable pair face-to-face with each other. The parting surfaces of the face-to-face mold-cavity inserts are brought into mutual contact such that the hemispherical cavities form a ball-cavity enclosing the resin and core. As the parting surfaces are brought into mutual contact, the self-centering devices of the face-to-face mold-cavity inserts are mutually engaged with each other to center the inserts with each other. The resin is then cured to form a covered golf ball. The mold-cavity inserts opened and the covered golf ball is removed from the ball cavity.

Engaging the self-centering devices desirably comprises automatically displacing, as required, at least one of the face-to-face mold-cavity inserts according to its x, y, z degrees of freedom, relative to the other insert and relative to the support members, to center the mold-cavity inserts with each other.

The foregoing and additional features and advantages of the invention will be more readily apparent from the following detailed description, which proceeds with reference to the accompanying drawings.

DETAILED DESCRIPTION

The invention is described in the context of representative embodiments that are not intended to be limiting in any way.

As used in this application and in the claims, the singular forms "a," "an," and "the" include the plural forms unless the context clearly dictates otherwise. Additionally, the term "includes" means "comprises." Further, the term "coupled" encompasses any of various ways in which one thing is linked, mounted, or attached to, and does not exclude the presence of intermediate elements between the coupled things.

In the following description, certain terms may be used such as "up," "down,", "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Mold bodies, as disclosed herein, for casting covers on golf balls generally comprise two mold halves each comprising a respective "plate" or analogous support member. Each plate holds at least one respective mold-cavity insert mounted thereto. Each mold-cavity insert defines a respective substantially hemispherical cavity having surficial features (e.g., dimple convexities) corresponding to desired features to be formed in a ball cover formed in the mold. In preparation for casting a ball cover, opposing mold-cavity inserts are brought together in face-to-face contact so that their respective hemispherical cavities form a spherical ball cavity in which the ball cover can be cast.

To facilitate their being brought together, the two mold halves can be hinged to each other in a book-like or clamshell manner and pivoted to open or close the ball cavities. Alternatively, one or both mold halves can be mounted on linear slides by which the mold halves are brought together face-to-face in a linear manner. Further alternatively, at least one of the mold halves can be mounted on a robotic device that brings the two mold halves together by any of various motions. Further alternatively, the mold halves can simply be configured to be moved and brought together by hand.

Each mold-cavity insert on one mold half corresponds to a respective mold-cavity insert on the other mold half. As a result, the two mold halves of the mold body comprise at least one (desirably multiple, such as four or eight) pair of opposing mold-cavity inserts that, when brought together, cooperate with each other in defining the respective ball cavity. To define the ball cavity fully in a manner suitable for casting a ball cover, the respective "parting surfaces" of the opposing mold-cavity inserts are brought into full contact with each other.

With respect to each pair of opposing mold-cavity inserts, at least one mold-cavity insert is mounted to its plate in a manner providing at least three degrees of freedom (x, y, z) of motion of the insert relative to the plate. Thus, the mold-cavity insert "floats" relative to the plate and relative to its opposite mold-cavity insert. Desirably, both opposing mold-cavity inserts are floating, each with its own independent x, y, z degrees of freedom, relative to the respective plates.

Opposing mold-cavity inserts also include self-centering devices that automatically engage with each other as the mold-cavity inserts are brought together to form the ball cavity. The self-centering devices of opposing mold-cavity inserts are progressively engaged as the mold-cavity inserts are brought closer together face-to-face, and are fully engaged when the parting surfaces of the inserts are in full contact with each other. Thus, the opposing mold-cavity inserts automatically self-center with each other, as required, as the mold halves are bought together for casting. Whereas the self-centering devices provide the impetus for this motion, as required, any actual motion that results is made possible by the x, y, z degrees of freedom of motion of the mold-cavity inserts relative to the respective plates. Each opposing pair of mold-cavity inserts of the mold body exhibits this self-centering motion, as needed, and such motion of one opposing pair of mold-cavity inserts is independent of such motion of any other opposing pair of mold-cavity inserts of the mold body. The self-centering movability of each opposing pair of inserts is independent of the manner in which the mold halves are brought together. Furthermore, the self-centering movability ensures that opposing pairs of mold-cavity inserts remain aligned with each other over the useful life of the mold. As the mold halves undergo wear with repeated use, the self-centering movability of the mold-cavity inserts substantially self-corrects misalignments of the inserts that otherwise would inevitably result from such wear.

Also desirably, at least one mold-cavity insert (of an opposing pair thereof) includes a bias. Thus, upon being urged into a particular position by its self-centering device, the mold-cavity insert normally tends to remain in the position until or unless urged into a new position by the self-centering device. A desired bias is in the z-direction relative to the plate, as achieved by, for example, a compression spring. This bias is described in more detail later below.

Representative Embodiment of Mold Half

Figure 1:
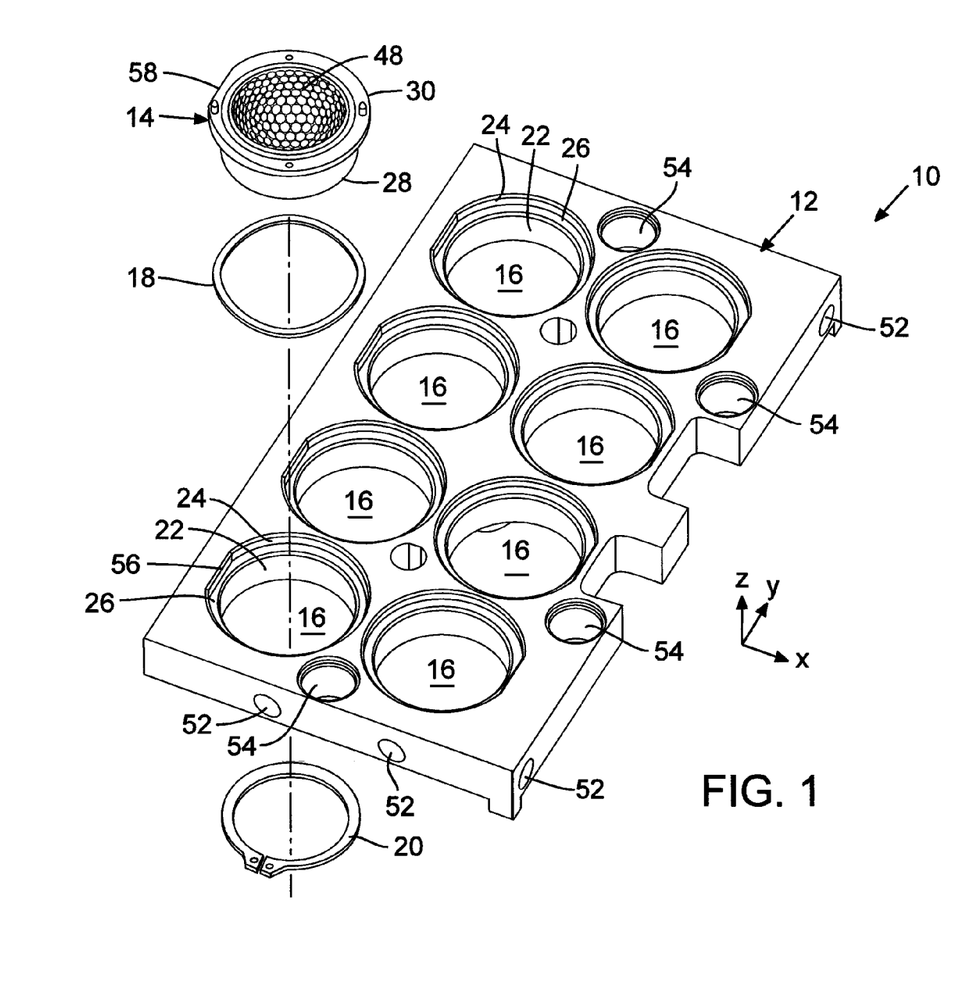
FIG. 1 is a perspective view of a representative embodiment of a mold half used for simultaneously casting covers on eight golf balls. Each of the eight large bores in the depicted plate accepts a respective mold-cavity insert; only one mold-cavity insert is shown, in an exploded manner. For casting, the depicted mold half is used with a mirror-image mold half (not shown) placed face-to-face with the depicted mold half to form a mold body defining eight ball cavities.

A representative embodiment of a mold half 10 is shown in FIG. 1. A complete mold body comprises two mold halves 10 that are mirror-images of each other. When brought together face-to-face, as described generally above, the two mold halves 10 define molds for forming covers simultaneously around multiple golf balls. This particular embodiment is configured to form covers around eight golf balls simultaneously.

The depicted mold half 10 comprises a plate 12 into which eight mold-cavity inserts 14 are mounted in respective bores 16 defined in the plate 12 (only one mold-cavity insert 14 is shown). Each mold-cavity insert 14 defines a respective hemispherical cavity 48. Each mold-cavity insert 14 is mounted to the plate 12 using a respective spring-washer 18 and a respective snap-ring 20. A particularly desirable type of spring-washer 18 is a so-called "wavy" spring-washer that, in contrast to a conventional flat washer, has a waviness or rippled configuration around its circumference that makes the washer compressible in its axial (z) direction. Each bore 16 comprises a smaller-diameter portion 22 and a larger-diameter portion 24 that form a shoulder 26 on which the spring-washer 18 rests.

Desirably, the plate 12 and mold-cavity inserts 14 are made of extremely rigid and stable metals or other suitable materials capable of being repeatedly subjected to molding conditions. The mold-cavity inserts 14 desirably are made of an alloy of stainless steel (e.g., 304SS or 316SS) for maximum inertness, thermal stability, and surface quality. The plate 12 can be made of stainless steel, but alternatively can be made of another suitable metal or combination of metals. An example is a layer of aluminum alloy sandwiched between two layers of titanium alloy, which has less mass than stainless steel and thus is more easily handled. This titanium sandwich adds appropriate hardness and wear resistance where needed (e.g., in the bores 16), despite its lower mass. Hence, the titanium sandwich is more desirable than making the plate 12 entirely of aluminum alloy. Another candidate material for the plate 12 is a ceramic material. An example thickness of the plate 12 is 1.5 inch.

Figure 2:
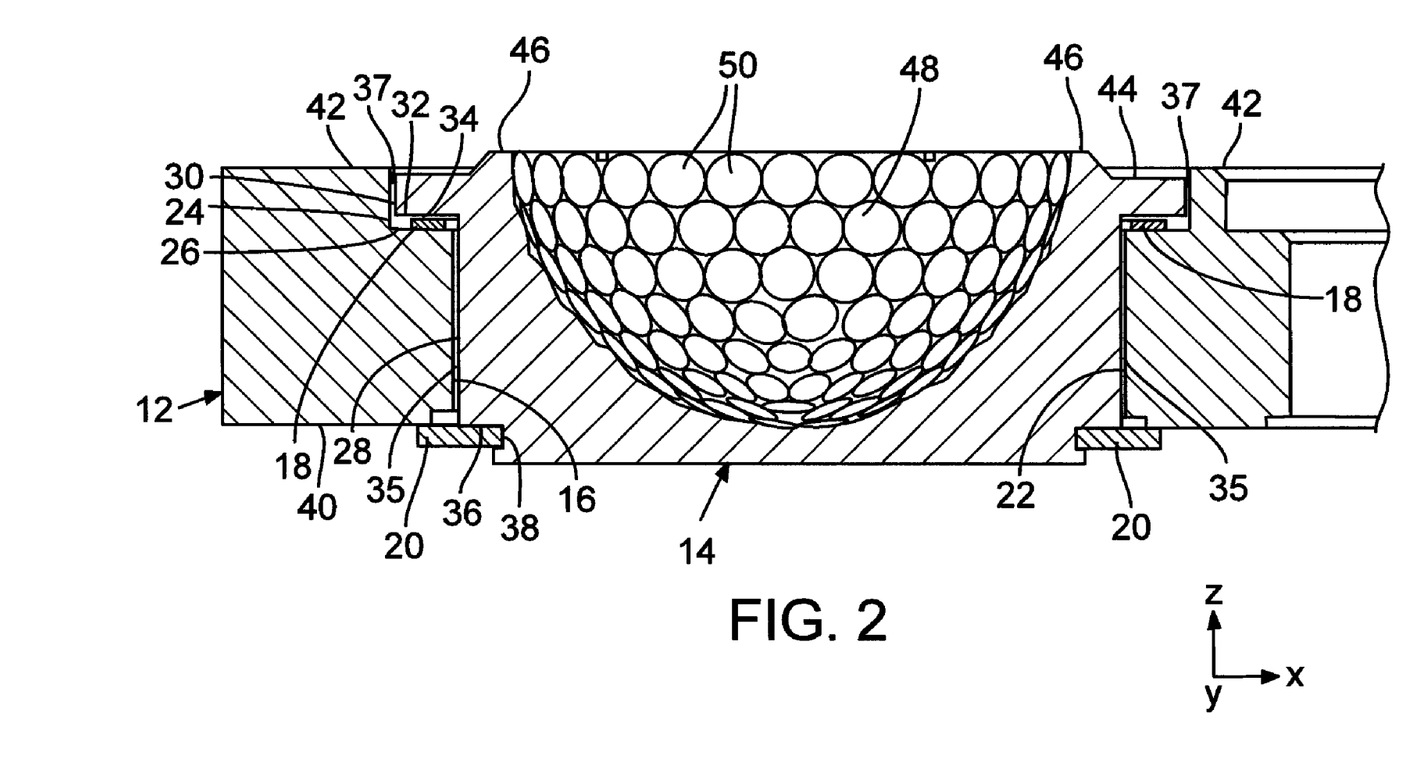
FIG. 2 is an elevational section of a mold-cavity insert situated in its respective bore in the plate of the mold half shown in FIG. 1.

Turning now to FIG. 2, a mold-cavity insert 14 is shown in section, as mounted in its respective bore 16 in the plate 12. Visible are the smaller-diameter portion 22, the larger-diameter portion 24, the shoulder 26, the spring-washer 18, and the snap-ring 20. The mold-cavity insert 14 comprises a narrower cylindrical portion 28 and a wider cylindrical portion or flange 30. The portions 28, 30 define a shoulder 32. The narrower cylindrical portion 28 slip-fits (with some diametrical clearance as discussed later below) into the smaller-diameter portion 22 of the bore 16, and the flange 30 slip-fits (with some diametrical clearance as discussed later below) into the larger-diameter portion 24 of the bore. The spring-washer 18 is situated between the shoulders 26 and 32 and creates a variable gap 34 therebetween as a result of the spring-washer's compressibility in the z-direction. The "lower" end 36 of the narrower cylindrical portion 28 defines a gland 38 into which the snap-ring 20 fits. I.e., the snap-ring 20 has an inside diameter that fits in the gland 38 and an outside diameter greater than the diameter of the smaller-diameter portion 22 and the diameter of the narrower cylindrical portion 28. Thus, the snap-ring 20 contacts the "lower" surface 40 of the plate 12. The gland 38 is situated so that, whenever the snap-ring 20 is in the gland, the spring-washer 18 applies a prescribed amount of compliant tension, in the z-direction, to the mold-cavity insert 14 relative to the plate 12.

Referring further to FIG. 2, the "upper" surface 42 of the plate 12 is shown. The larger-diameter portion 24 of the bore 16 extends depth-wise from the upper surface 42 into the plate 12 and receives the flange 30. The "upper" surface 44 of the flange 30 is shown, slightly recessed below the upper surface 42. Thus, the flange 30 has a parting surface 46 that is "prouder" than the upper surfaces 42, 44. I.e., the parting surface 46 in FIG. 2 is slightly higher than the surfaces 42, 44. By way of example, the parting surface 46 is prouder by 0.080 inch than the upper surfaces 42, 44.

As noted, the mold-cavity insert 14 defines a hemispherical cavity 48, which can be seen in FIGS. 1 and 2. The surface of the hemispherical cavity 48 includes multiple small, shallow, convexities 50 that define corresponding dimples in the surface of the ball cover during casting. As two mold halves 10 are brought together face-to-face, mold-cavity inserts 14 of opposing pairs thereof contact each other at their parting surfaces 46. Hence, each pair of inserts forms a respective spherical ball cavity in which a respective ball cover is cast.

The mold-cavity insert 14 has three degrees of freedom of movability relative to the plate 12, namely movability in the x-, y-, and z-directions. Movability of the insert 14 in the x-y plane is achieved by providing the smaller-diameter portion 22 and larger-diameter portion 24 of the bore 16 with respective excess diametrical clearances 35, 37 relative to the narrower cylindrical portion 28 and flange 30, respectively. An example clearance 35, 37 is 0.010 inch or less, or 0.005 inch or less, or 0.003 inch or less. Thus, the mold-cavity insert 14 has a small amount of "float" in the x-y plane (i.e., has two degrees of freedom of motion in that plane). Movability of the insert 14 in the z-direction is independent of movability in the x-y plane, and is a result of the compliant z-direction compressibility provided to the insert by the spring-washer 18, relative to the plate 12. The "compliant" nature of this insert compressibility is provided by the z-direction compressibility of the spring-washer 18 (e.g., a compressibility of 0.036 inch). Thus, the mold-cavity insert 14 also has a small amount of "float" in the z-direction. By way of example, and not intending to be limiting in any way, if the parting surface 46 is prouder by, nominally, 0.080 inch than the upper surfaces 42, 44, and the spring-washer 18 has an axial compressibility of 0.036 inch, then the minimum "proudness" of the parting surface 46 is 0.044 inch.

The snap-ring 20 in its gland 38 and in contact with the lower surface 40 limits the amount of upward motion permitted to the mold-cavity insert 14 relative to the plate 12. The maximum z-direction compressibility of the spring-washer 18 poses a limit to the amount of downward motion permitted to the insert 14 relative to the plate 12. Desirably, the position of the snap-ring 20 in the z-direction is such that, at the upward-motion limit of the insert 14 relative to the plate 12, the spring-washer 18 is still under slight compression, which serves to maintain the position of the insert in the x-y plane. This also ensures that, at the moment of mutual contact of the parting surfaces 46 of opposing inserts 14 being brought together for casting, the inserts are still under the effect of slight compression of the spring-washer 18. Returning to FIG. 1, the plate 12 also defines bores 52 used for receiving respective clamping pins (not shown) used for holding two plates (with mold-cavity inserts 14) together face-to-face. The plate 12 also defines bores 54 used for receiving respective alignment pins (not shown) used, for aligning two mold bodies 10 (with respective mold-cavity inserts 14) together face-to-face. FIG. 1 also shows that, with respect to each bore 16, the larger-diameter portion 24 desirably includes a flat 56 that engages a corresponding flat 58 on the edge of the flange 30 of the respective mold-cavity insert 14. With mutual engagement of the flats 56, 58, the mold-cavity inserts 14, while being allowed to float in the x-, y-, and z-directions, are substantially constrained from rotating in their respective bores 16 about their respective z-axes (i.e., constrained with respect to $\theta_z$ motion).

Figure 3:
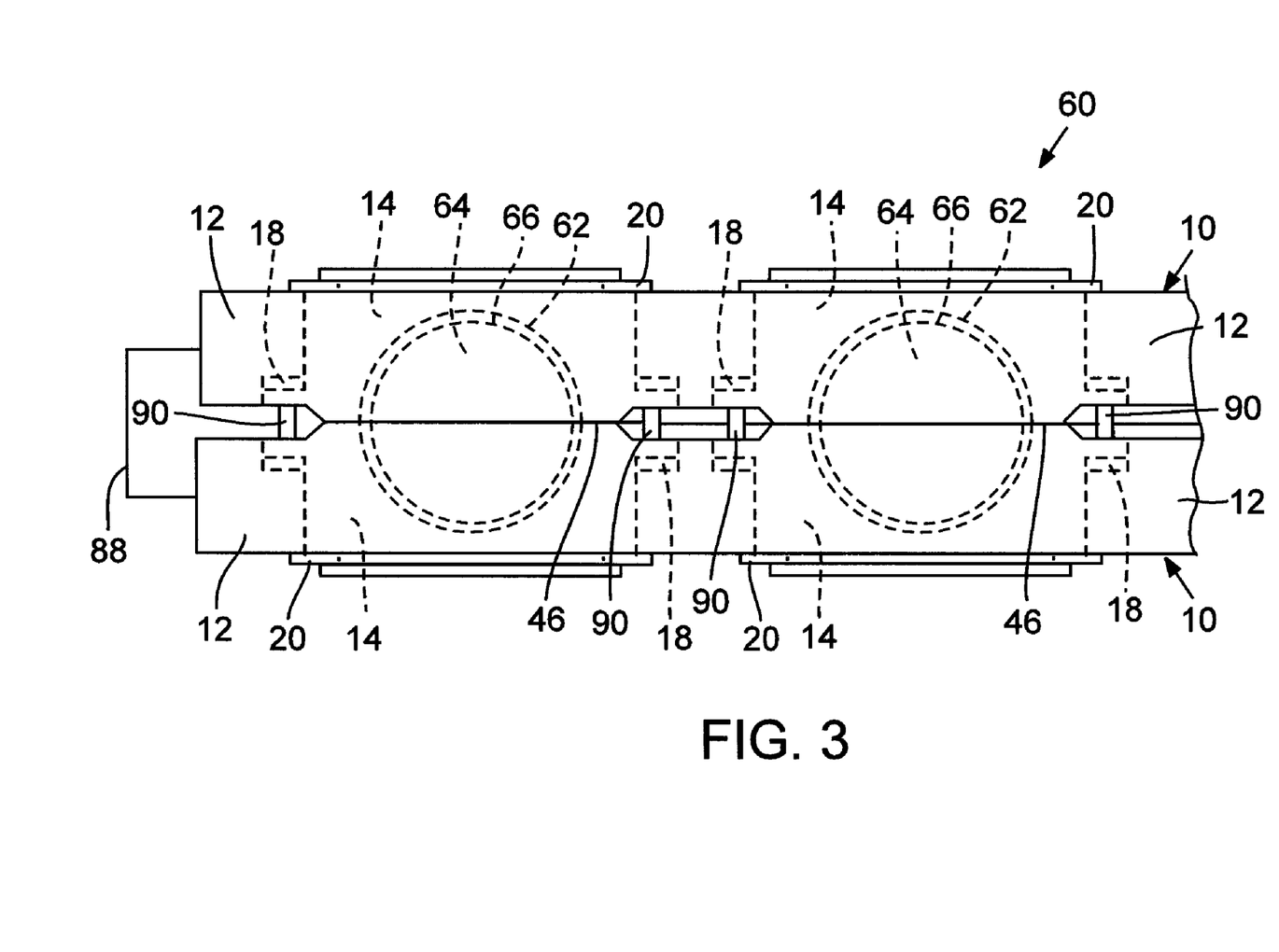
FIG. 3 is an elevational section of portion of a mold body comprising two mold halves, configured as shown in FIGS. 1 and 2, situated face-to-face for casting. A golf ball is shown in each of the depicted ball cavities.

An assembly 60 of two opposing mold halves 10 with mated mold-cavity inserts 14 is shown in FIG. 3. The mold-cavity inserts 14 are mated at their respective parting surfaces 46. The hemispherical cavities 48 of each mated pair define a respective spherical ball cavity 62. During cover-molding, each ball cavity 62 receives a respective core 64 and a respective amount of resin (e.g., polyurethane precursor) sufficient to form a cover 66 of uniform thickness completely around the core.

Schematically depicted in FIG. 3 is a coupling device 88 configured at least to bring the two mold bodies 10 together face-to-face. The coupling device 88 can be, for example, a hinge or analogous pivoting device by which the mold bodies 10 come together and open in the manner of a book. Alternatively, the coupling device 88 can be a linear slide or analogous structure that brings the mold bodies 10 together linearly. The coupling device 88 also can provide mechanical support for the mold bodies 10 especially when the mold bodies are in face-to-face contact as shown in FIG. 3

Figure 4A:
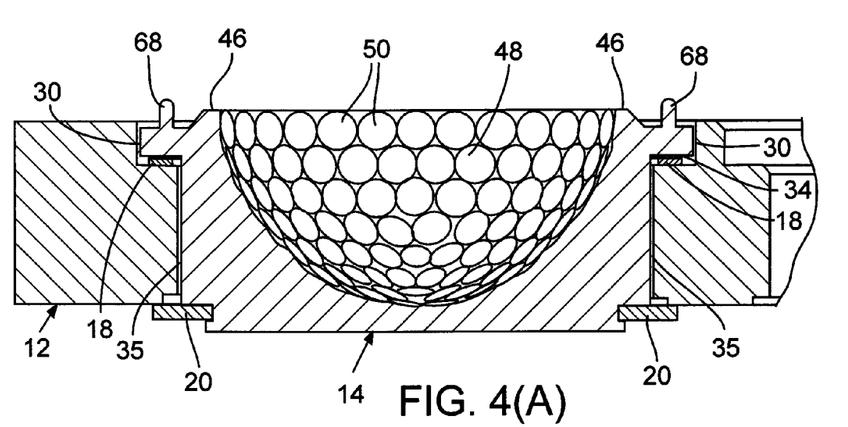
FIG. 4(A) is an elevational section of a first embodiment of a mold-cavity insert, including centering means.
Figure 4B:
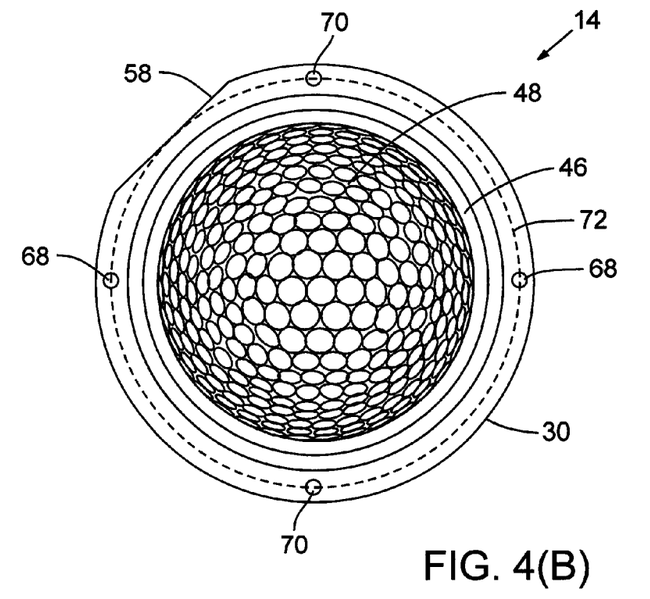
FIG. 4(B) is a plan view of the mold-cavity insert of FIG. 4(A).

Although not shown in FIG. 1 or 2 (but see items 90 in FIG. 3), near the parting surfaces 46 of each mold-cavity insert 14 are respective self-centering devices 90 for achieving (in view of the x-y-z float of the inserts 14) substantial alignment (including centering) of the insert with its opposing counterpart insert in the opposing plate 12. In one embodiment, as shown in FIGS. 4(A)-4(B), the self-centering devices comprise multiple tapered pins 68 and tapered holes 70 arranged on a bolt circle 72 that is concentric with but outboard of the parting surface 46. The profile of the pins 68 desirably conforms to the depth profile of the holes 70. The pins 68 and holes 70 desirably are arranged in alternating order around the bolt circle 72 on each insert 14. At least two pins 68 and two holes 70 are provided on each mold-cavity insert 14 such that the holes 70 on one insert 14 receive corresponding pins 68 on the facing insert whenever the inserts 14 come together for molding. Note that engagement of the pins 68 with respective holes 70 still allows the parting surfaces 46 on facing inserts 14 to contact each other during use for molding. Note also that, with each mold-cavity insert 14, mutual engagement of the flats 56, 58 keeps the pins 68 and respective holes 70 in substantial $\theta_z$ alignment with each other.

In some embodiments the multiple pins 68 and holes 70 are arranged in alternating order around the bolt circle 72. In alternative configurations, especially those having more than four pins and holes per mold-cavity insert 14, the order of pins and holes can be changed, such as two pins 68 followed by two holes 70, and so on, around the bolt circle 72. The minimum number of pins and holes around the circle 72 is at least three; a total of four (as shown) is more desirable. Other practical numbers are six and eight. In other alternative configurations, instead of pins and holes being provided on each insert 14, each insert can have either all pins 68 or all holes 70 arranged around its bolt circle 72 (with the opposing insert having all holes 70 or all pins 68, respectively). In any event, as opposing mold-cavity inserts 14 come together for molding, the pins 68 on one insert enter corresponding holes 70 on the fading insert as their respective parting surfaces 46 come into mutual contact.

As facilitated by the taper of the pins 68 and holes 70 and by the x-y-z float of the inserts 14, the respective inserts of each opposing pair self-align with each other. I. e., if one insert 14 of the pair is slightly misaligned or not centered with its opposing insert, entry of the tapered pins 68 of one insert into respective holes 70 of the opposing insert urges appropriate movement, in the x-y plane, of one or both inserts of the pair relative to each other and relative to the respective plates 12 to restore mutual alignment of the inserts. Also, full contact of the parting surfaces 46 of opposing inserts 14 is assured by compensating motion of one or both inserts against their compressibility in the z-direction. Each opposing pair of mold-cavity inserts 14 self-aligns in this manner, independently of the other pairs of inserts mounted in the same plates 12. Self-alignment occurs even if the opposing plates 12 have become misaligned with each other such as through extended use or wear.

Figure 6:
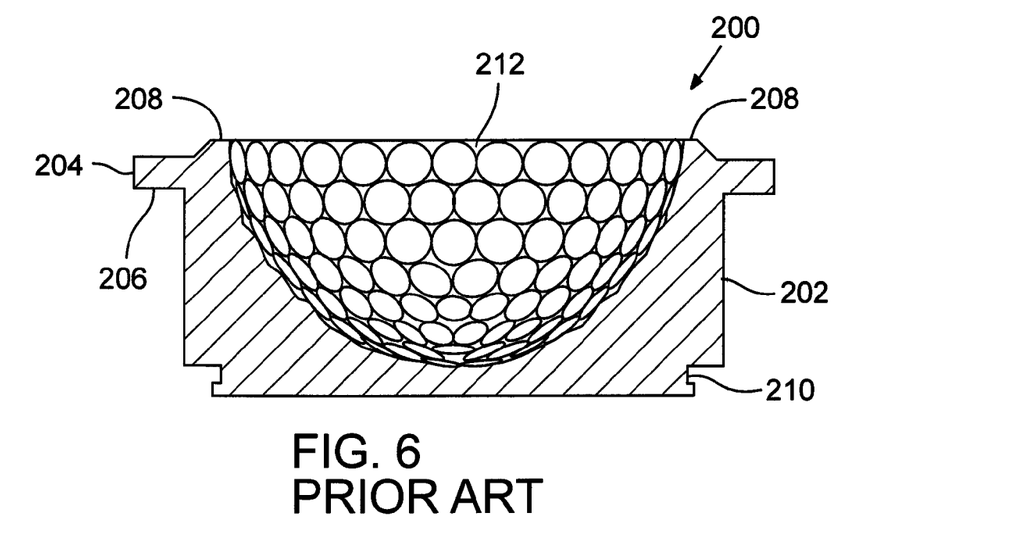
FIG. 6 is an elevational section of a conventional mold-cavity insert.

For comparison, a conventional mold-cavity insert 200 for casting golf-ball covers is shown in FIG. 6. The depicted insert 200 comprises a narrower cylindrical portion 202, a flange 204, a shoulder 206, a parting surface 208, and a snap-ring gland 210. The mold-cavity insert 200 defines a hemispherical cavity 212. The mold-cavity insert 200 fits into a corresponding bore in a plate (not shown), but not in a manner that provides any compressibility of the insert in the z-direction, not in a manner that provides x-y-z float of the insert in the plate, and not in a manner that achieves self-centering of opposing mold-cavity inserts in facing mold halves.

Figure 5A:
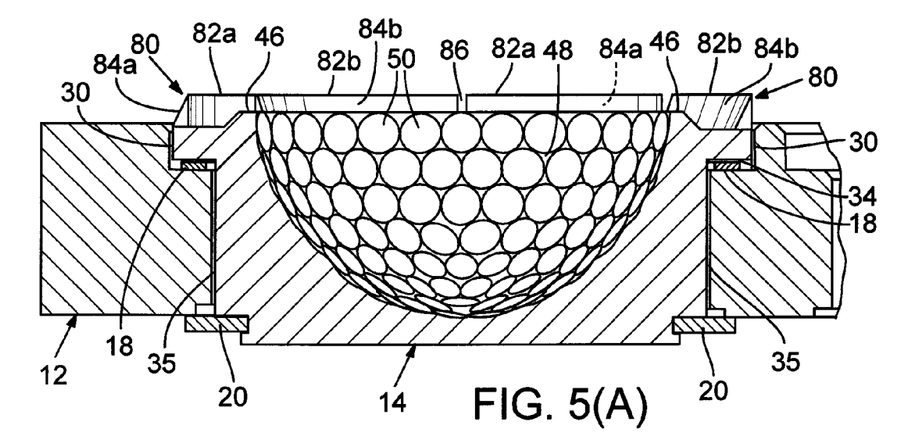
FIG. 5(A) is an elevational section of a second embodiment of a mold-cavity insert, including centering means.
Figure 5B:
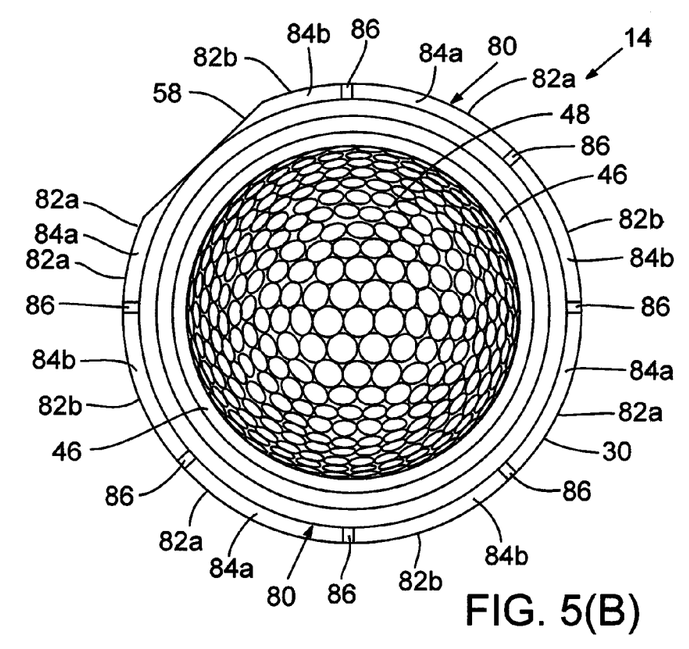
FIG. 5(B) is a plan view of the mold-cavity insert of FIG. 5(A).

An alternative embodiment of a self-centering device, shown in FIGS. 5(A)-5(B), comprises a circumferential projecting edge 80 that extends in the z-direction. The projecting edge 80 is concentric with but outboard of the parting surface 46. The projecting edge 80 comprises portions 82a, 82b having respective sloped sides 84a, 84b. The sloped sides 84a face radially inward, and the sloped sides 84b face radially outward. On opposing mold-cavity inserts 14, the inward-sloped sides 84a on one insert engage respective outward-sloped sides 84b on the opposing insert. Engagement of the sloped sides 84a, 84b with their respective counterparts on facing inserts 14 still allows contact of the parting surfaces 46 on the facing inserts 14 with each other during use for molding. Note also that, with each mold-cavity insert 14, mutual engagement of the flats 56, 58 keeps the sloped sides 84a, 84b in substantial rotational alignment with each other.

For engagement, it is not necessary that the slopes on opposing sloped sides 84a, 84b be identical, since self-alignment of the opposing mold-cavity inserts 14 is achievable in either event. The portions 82a, 82b in each circumferential edge array 80 desirably are separated from each other by a gap 86. The number of portions 82a, 82b is shown as eight per insert 14, but this number is not intended to be limiting for achieving self-alignment of opposing inserts.

As facilitated by the slopes of the sloped sides 84a, 84b and by the x-y-z float of the mold-cavity inserts 14, facing inserts automatically self-center and thus align with each other as the inserts are being brought together face-to-face. I.e., if one insert 14 is slightly misaligned with its mating insert 14, engagement of the portions 82a, 82b with each other on facing inserts urges appropriate movement, in the x-y plane, of one or both inserts relative to each other and relative to the respective plates 12 to restore mutual alignment of the inserts. In a mold body comprising two opposing meld halves 10, each facing pair of mold-cavity inserts 14 self-centers in this manner. Self-centering of each opposing pair of inserts 14 occurs independently of the other inserts mounted in the same plates 12, and occurs even if the opposing plates 12 are not exactly aligned with each other. As in the embodiment of FIGS. 4(A)-4(B), this self-centering of inserts 14 continues even in worn plates 12 that are misaligned with each other.

In an exemplary casting process, a prepolymer resin (e.g., diisocyanate, polyol, and a colorant) is prepared. A curing agent (e.g., polyamine) is added and the resulting mixture is dispensed into each of the mold-insert cavities in a first mold half. The mixture is allowed to react in the cavities for a time required for the mixture to achieve a partial cure ("semi-gelled" state). Within the partial-cure time, a core is suspended in each cavity. The partial cure is sufficient to support the core without having to use an appliance (e.g., centering pins) to hold the core. The mixture is also dispensed into each of the mold-insert cavities in a second mold half. The first mold half is inverted, placed over the second mold half, and brought together with the second mold half to form respective ball cavities. Details of this casting process are set forth in U.S. Pat. No. 7,244,384, incorporated herein by reference.

Although the embodiments described above utilize a wavy spring-washer 18 to provide compressibility of the mold-cavity insert 14 relative to the plate 12 in at least the z-direction, it will be understood that other types of biasing devices alternatively could be used. For example, the wavy spring washer 18 can be replaced with a conventional compression coil-spring. As another example, multiple individual springs can be positioned at respective positions between the surfaces 26, 32 to provide, collectively, the desired z-direction bias of the insert 14 relative to the plate 12. Advantages of the wavy spring-washer 18 are that it is very simple, reliable, and capable of providing a strong bias force in the z-direction over a short distance.

It is not necessary that both mating mold-cavity inserts have a respective wavy spring or other biasing device. In some embodiments, self-alignment of opposing mold-cavity inserts with each other can be effectively achieved if one of the mating mold-cavity inserts has a biasing device. Indeed, one of the mating mold-cavity inserts can be fixed while the other is floating and includes a biasing device.

With respect to mating mold-cavity inserts, floatability in at least three degrees of freedom of at least one relative to the other is desirable. In many embodiments, this floatability is in x, y, and z degrees of freedom. These particular degrees of freedom are not intended to be limiting. For example, other embodiments may have floatability in any three or more of the following degrees of freedom: x, y, z, $\theta_x$, $\theta_y$, $\theta_z$.

Also, although the embodiments described above utilize a snap-ring 20 for holding a mold-cavity insert 14 in its respective bore 16 in the plate 12, it will be understood that other types of fasteners alternatively can be used. For example, the snap-ring 20 can be replaced with one or more pins, bolts, or the like. An advantage of the snap-ring 20 is that it provides its intended functions with the need to use only a single, simple, and highly reliable component.

Golf-ball covers formed using the apparatus and methods discussed above are not necessarily flashless, and obtaining flashless balls is not an objective of the associated casting methods. Since the casting is performed at substantially zero gauge pressure, and since the parting surfaces of opposing mold-cavity inserts are in full contact with each other against the z-direction bias provided by the spring-washer, the amount of flash usually left on the ball after casting tends to be low. Also, as a result of the mold-cavity inserts being self-centering with respect to each other, whatever flash is formed tends to be substantially uniform around the ball. This flash is easily removed by buffing or the like. This is in contrast to conventional injection-molding and compression-molding techniques and apparatus that, due in part to the very high temperatures and pressures that are required, tend to form substantial but differing amounts of flash that is difficult and time-consuming to remove.

Whereas the invention has been described in connection with several representative embodiments, it will be understood that it is not limited to those embodiments. On the contrary, the invention is intended to encompass all modifications, alternatives, and equivalents as may be included within the spirit and scope of the invention, as defined by the appended claims.

What is claimed is:

1. A method for casting a cover on a golf ball, comprising:
mounting at least one opposable pair of first and second mold-cavity inserts, each insert defining a respective substantially hemispherical cavity for casting a respective half of a cover and each insert defining a respective parting surface, to respective support members in a manner providing at least one of the first and second mold-cavity inserts with floatability in at least three degrees of freedom relative to the respective support member;
providing the mold-cavity inserts of the opposable pair with respective self-centering devices;
with respect to the mold-cavity inserts of the opposable pair, adding a castable resin and core to the hemispherical cavities;
moving the support members to position the mold-cavity inserts of the opposable pair face-to-face with each other;
bringing the parting surfaces of the face-to-face mold-cavity inserts into mutual contact such that the hemispherical cavities form a ball-cavity enclosing the resin and core;
as the parting surfaces are brought into mutual contact, mutually engaging the self-centering devices of the face-to-face mold-cavity inserts with each other to center the inserts with each other;
curing the resin to form a covered golf ball; and
opening the mold-cavity inserts and removing the covered golf ball from the ball cavity.

2. The method of claim 1, wherein the at least three degrees of freedom comprise x, y, and z degrees of freedom.

3. The method of claim 1, wherein engaging the self-centering devices comprises automatically displacing, as required, at least one of the face-to-face mold-cavity inserts according to its at least three degrees of freedom, relative to the other insert and relative to the support members, to center the mold-cavity inserts with each other.

4. The method of claim 1, wherein providing the mold-cavity inserts of the opposable pair with respective self-centering devices comprises providing the inserts with pins and conforming holes that mutually engage with each other as the parting surfaces are brought into mutual contact.

5. The method of claim 1, wherein providing the mold-cavity inserts of the opposable pair with respective self-centering devices comprises providing the inserts with sloping surfaces that mutually engage with each other as the parting surfaces are brought into mutual contact.

6. The method of claim 1, further comprising, with respect to the opposable pair of mold-cavity inserts, providing at least one of the inserts with a z-direction bias.

* * * * *